United States Patent [19]

Rogers

[11] 4,045,579
[45] Aug. 30, 1977

[54] PROCESS FOR PASTEURIZING RAW POULTRY

[75] Inventor: Alan Barde Rogers, Palos Park, Ill.

[73] Assignee: Armour and Company, Phoenix, Ariz.

[21] Appl. No.: 604,629

[22] Filed: Aug. 14, 1975

Related U.S. Application Data

[63] Continuation of Ser. No. 477,058, June 6, 1974, abandoned.

[51] Int. Cl.² ............................................. A22C 21/04
[52] U.S. Cl. .................................. 426/327; 426/332; 426/438; 426/521
[58] Field of Search ............... 426/521, 509, 520, 524, 426/310, 444, 307, 332, 327, 438, 441, 439, 89; 21/99, 86

[56] References Cited

U.S. PATENT DOCUMENTS

| 3,261,694 | 7/1966 | Forkner | 426/438 X |
| 3,522,058 | 7/1970 | Libby | 426/382 |

FOREIGN PATENT DOCUMENTS

| 2,040,430 | 8/1970 | Germany | 426/521 |
| 1,492,701 | 8/1969 | Germany | 426/521 |
| 776,704 | 6/1957 | United Kingdom | 426/520 |
| 23,666 | 12/1914 | United Kingdom | 426/521 |

*Primary Examiner*—S. Leon Bashore
*Assistant Examiner*—Kenneth M. Schor
*Attorney, Agent, or Firm*—Frank T. Barber; Carl C. Batz

[57] ABSTRACT

A process for treating raw poultry to pasteurize the surface thereof by dipping the poultry in oil having a temperature from 180°-315° F. for a period of from 10 to 60 seconds to reduce the surface bacteria without materially affecting the natural bloom of the poultry.

8 Claims, No Drawings

PROCESS FOR PASTEURIZING RAW POULTRY

This is a continuation of application Ser. No. 477,058 filed June 6, 1974 and now abandoned. su This invention relates to a process for treating raw poultry to pasterize it, and more particularly to such a process which avoids heating the poultry internally and which leaves the poultry with the natural appearance of raw poultry.

BACKGROUND

For many years there has been interest on the part of governmental agencies and also consumers in the bacterial contamination of poultry and there has been a need for some way of controlling the microbial flora on the surface of the poultry without impairing the appearance, flavor and other quality attributes of the poultry.

The poultry may be heated in water to the degree that heat penetrates at least through the skin and this does not reduce the bacterial flora on the skin, but it also results in a changed appearance. The skin looses its natural bloom, becomes a grey color and has a "cooked" appearance.

Attempts have also been made to treat the surface of the poultry with chemical solutions at below cooking temperatures, and in some instances limited success has been achieved, but such methods are open to the criticism that the chemical may be absorbed into the poultry and in itself be a source of contamination.

SUMMARY

I have discovered that by dipping the poultry carcass in an edible oil which has been heated to a temperature of from 180° to 315° F. for a very short period of time, from 10 to 60 seconds, the bacteria on the surface of the poultry can be materially reduced. This treatment increases shelf life while at the same time leaving the poultry with a natural raw appearance with good bloom. I am surprised that such a result is obtained by the oil treatment especially since such a treatment with water gives either unsatisfactory pasteurization or a cooked appearance, depending on the temperatures used.

DESCRIPTION

The treatment of this invention applies to poultry generally, but more especially to turkeys and chickens which are produced in large numbers. The poultry is slaughtered and the feathers and entrails removed. This carcass, with its skin still on, may then be treated in accordance with my invention by hand dipping the carcass in the heated oil, but preferably the process is carried out by attaching the carcass by its feet to a conveyor chain and arranging a vat of hot oil through which the carcass is passed as the conveyor chain moves forwardly, the speed of the conveyor being such that the carcass remains immersed for the period of time presribed.

The process may also be carried out by placing poultry carcasses in a wire basket and immersing the basket into hot fat in a suitable container. After the prescribed period of time the basket is removed from the fat the poultry drained, chilled and sent on its way in the usual packing operation.

The fat in which the poultry is immersed may be any animal or vegetable oil or any edible triglyceride which is liquid at a temperature of about 150° F.. For example, I may use corn oil, cottonseed oil, soya oil, lard, or mixtures of natural or synthetic triglycerides.

The oil may be placed in a suitable container and heated to a temperature of from 180° F. to 315° F., and this temperature maintained during the treatment of the poultry. The poultry is then immersed in a heated oil as above explained and left immersed for a period of from 10 to 60 seconds at which time it is removed from the oil. After the excess oil drains from the carcass it may be packed in accordance with usual practices and passed into marketing channels.

The temperatures and times just mentioned are critical to the success of the treatment. If the temperature of the fat is to low and/or the time of immersion too low, the pasteurization of the surface of the poultry will be inadequate, and if the temperature of the fat is too high and/or the time of immersion is too great the treated poultry will appear to be "cooked" and the natural bloom of the raw poultry will be lost. It may also be understood that somewhat greater immersion times may be coupled with lower temperatures and lower immersion times with higher temperatures, within the ranges specified.

I find that better results are obtained when the poultry to be treated is chilled to a temperature within the range of about 32° to 42° F. before it is subjected to immersion in the fat. Chilling the poultry permits surface heating without substantially raising the temperature of the carcass or the part which is being treated. The treated poultry may then be packaged for shipment without further chilling and while avoiding recontamination.

In the usual practice of my invention the carcasses, after the dipping treatment, are drained of excess fat and packaged, chilled and marketed. If desired, the carcasses may be frozen, either before or after the treatment in hot oil.

The benefits from the improved process appear to flow principally from the lower bacteria count on the skin surface of the poultry. I find that this count is very dramatically reduced by the fat treatment, and this may be a reduction from a count of about 10,000 without the treatment to a count of about 40 with the fat treatment, a reduction of about 99%. At the same time the treated poultry retains its natural bloom and appearance and has increased shelf life at refrigerated temperatures. Cooking of the treated poultry demonstrates that it is unchanged in flavor, tenderness, and juiciness. By this process the consumer is provided with a wholesome poultry product free of pathogenic organisms such as salmonella and staphylococcus, and having a very low count of total surface bacteria. Further, the thin surface coating of the fat which is retained on the poultry serves to reduce the moisture lost through dripping during distribution and marketing, and when the poultry is cooked the thin fat layer provides initial basting material.

Instead of dipping the whole carcass into the fat as above described, the carcass may be cut up into thighs, breasts, or other parts, and these parts subjected to dipping in the hot fat. In such case the bacteria on the skin of the various parts are substantially reduced and the skin retains the original appearance of raw poultry.

The following examples demonstrate more specifically the practice of my process and the benefits to be obtained from it.

EXAMPLE 1

Whole fresh chickens in cut up form, were obtained from a market and swabs were taken on the breasts and thighs and the bacteria count determined to be of the order of 10,000 per square inch.

The parts were dipped in a hydrogenated vegetable fat heated to 250° F., for 10 seconds. After dipping, swabs of the treated parts were again tested and the bacteria count was found to be reduced by the order of 90%.

The above treatment was repeated using oil having a temperature of 300° F..

No noticeable changes were noted on the parts except for the liver and gizzard. At the 300° F. temperature some whitening of the exposed flesh did occur, but this was not objectionable, and this effect tended to diminish after a time. Upon draining, the oil left a very thin coating on the chicken parts.

EXAMPLE 2

A series of tests were planned to demonstrate the effect of using oil compared to water and the effect of different oil temperatures and dipping times both as to the reduction in bacterial count and appearance of the treated poultry. In each case a count of bacteria was taken before and after treatment. The bacteria counts before and after each of the different tests is given as follows:

|  | Total Plate Count |
|---|---|
| Before using water at 212° F. for 20 seconds | 44,000 |
| Before using water at 212° F. for 40 seconds | 37,000 |
| After using water at 212° F. for 20 seconds | 23 |
| After using water at 212° F. for 40 seconds | 44 |
| Before using oil at 300° F. for 5 seconds | 18,000 |
| Before using oil at 300° F. for 10 seconds | 9,200 |
| Before using oil at 300° F. for 15 seconds | 5,000 |
| After using oil at 300° F. for 5 seconds | 450 |
| After using oil at 300° F. for 10 seconds | 500 |
| After using oil at 300° F. for 15 seconds | 980 |
| Before using oil at 325° F. for 5 seconds | 4,600 |
| Before using oil at 325° F. for 10 seconds | 1,600 |
| Before using oil at 325° F. for 15 seconds | 8,000 |
| After using oil at 325° F. for 5 seconds | 1,400 |
| After using oil at 325° F. for 10 seconds | 180 |
| After using oil at 325° F. for 15 seconds | 2 |

Both tests using boiling water produced a cooked appearance on the chicken which would be unacceptable in the market.

The tests using 300° F. fat produced a poultry product which looked good with substantially no change from the prior natural raw appearance.

The tests using 325° F. fat produced a boiling effect about the chicken parts when they were immersed and thre treated poultry showed some change toward a cooked appearance.

The poultry subjected to the above tests had been chilled to a temperature of about 40° F. to test the effect of temperature of the poultry which is subjected to treatment. Two parts of chilled poultry were left to stand at room temperature for an hour and then were dipped in 300° F. fat for 15 seconds. This treated poultry appeared not to be quite as desirable as the poultry which, in chilled condition, was subjected to immersion in 300° F. fat for 15 seconds.

EXAMPLE 3

To test the reduction in bacterial count comparing oil with water and variation of temperature between 180° F. and 315° F. and variation of times between 10 and 60 seconds, I made the tests described as follows:

|  | Total Plate Count | Approximate Reduction |
|---|---|---|
| Before treatment of poultry in 180° F. oil for 60 secs | 74,000 |  |
| After treatment in 180° F. oil for 60 sec | 160 | 99.7% |
| Before treatment in hot water at 180° F. for 10 sec | 210,000 |  |
| After treatment in hot water at 180° F. for 10 sec | 12,000 | 94% |
| Before treatment in hot oil at 210° F. for 60 sec | 350,000 |  |
| After treatment in hot oil at 210° F. for 60 sec | 50,000 | 88% |
| Before treatment in hot water at 212° F. for 5 sec | 360,000 |  |
| After treatment in hot water at 212° F. for 5 sec | 12,000 | 96% |
| Before treatment in oil at 250° F. for 25 sec | 300,000 |  |
| After treatment in oil at 250° F. for 25 sec | 11,000 | 96% |
| Before treatment in oil at 250° F. for 15 sec | 1,100,000 |  |
| After treatment in oil at 250° F. for 15 sec | 140,000 | 87% |
| Before treatment in oil at 275° F. for 10 sec | 1,100,000 |  |
| After treatment in oil at 275° F. for 10 sec | 26,000 | 97% |
| Before treatment in oil at 275° F. for 15 sec | 650,000 |  |
| After treatment in oil at 275° F. for 15 sec | 9,800 | 98.5% |
| Before treatment in oil at 300° F. for 5 sec | 120,000 |  |
| After teatment in oil at 300° F. for 5 sec | 9,800 | 91.8% |
| Before treatment in oil at 300° F. for 10 sec | 130,000 |  |
| After treatment in oil at 300° F. for 10 sec | 5,000 | 96% |
| Before treatment in oil at 315° F. for 5 sec | 4,000 |  |
| After treatment in oil at 315° F. for 5 sec | 33 | 99.1% |
| Before treatment in oil at 315° F. for 10 sec | 3,500 |  |
| After treatment in oil at 315° F. for 10 sec | 5 | 99.9% |

Although a reduction in bacteria count was obtained also when using water as the liquid in which the chicken was dipped, the appearance of the chicken subjected to water treatment was so altered as to be unacceptable in the market place.

EXAMPLE 4

In order to demonstrate the effect of the improved process on frozen poultry carcass parts, chicken thighs and chicken drumsticks were purchased at a local supermarket, placed in a freezer and left over night. The following day the frozen chicken parts were dipped into a hydrogenated vegetable shortening for various times and temperatures. The poultry was tested for development of bacteria both before and after treatment by swabing one square inch of surface on the parts or by removing skin samples before and after treatment. In the case of the skin samples the skin was blended in sterile water and plated out using Difco Plate Count Agar.

The results are tabulated as follows:

| Temperature of the oil | Time of Emersion (seconds) | Total Bacteria Count | | Percent Kill |
|---|---|---|---|---|
| | | Before Treatment | After Treatment | |
| a. drumsticks | | | | |
| 310° | 30 | $6.6 \times 10^6$ | $1.1 \times 10^4$ | 99.8 |
| 310° | 20 | $5.8 \times 10^7$ | $4.2 \times 10^5$ | 99.3 |
| 310° | 15 | $3.5 \times 10^6$ | $1.1 \times 10^5$ | 96.9 |
| b. thighs | | | | |
| 325° | 30 | $3.0 \times 10^4$ | $1.0 \times 10^3$ | 96.5 |
| 310° | 20 | $2.6 \times 10^4$ | $1.3 \times 10^3$ | 95.0 |
| 310° | 10 | $5.7 \times 10^4$ | $5.5 \times 10^3$ | 90.5 |

EXAMPLE 5

Two whole turkey carcasses which had been held in frozen storage were thawed and dipped into a heated vegetable shortening for 15 seconds and also for 20 seconds. Bacterial counts were made before and after dipping as to the breast and as to the cavity of each carcass. The results were as follows:

| Temperature of the oil | Time of Emersion (Seconds) | Total Bacteria Count | | Percent Kill |
|---|---|---|---|---|
| | | Before Treatment | After Treatment | |
| a. breast - Sample No. 1 | | | | |
| 300° | 15 | $4.1 \times 10^4$ | $1.8 \times 10^3$ | 95.6 |
| 300° | 20 | $2.7 \times 10^4$ | $4.0 \times 10^2$ | 98.5 |
| b. breast - Sample No. 2 | | | | |
| 300° | 15 | $2.2 \times 10^4$ | $2.0 \times 10^2$ | 99.1 |
| 300° | 20 | $1.8 \times 10^4$ | $1.0 \times 10^2$ | 99.5 |
| c. cavity - Sample No. 1 | | | | |
| 0° | 15 | $6.0 \times 10^2$ | $2.0 \times 10^2$ | 66.6 |
| 300° | 20 | $1.7 \times 10^3$ | $1.0 \times 10^2$ | 94.1 |
| d. cavity - Sample No. 2 | | | | |
| 300° | 15 | $1.7 \times 10^3$ | $5.0 \times 10^2$ | 70.6 |
| 300° | 20 | $1.0 \times 10^3$ | $1.0 \times 10^2$ | 90.0 |

While only certain embodiments of my invention have been described in detail it is to be understood that many embodiments may be practiced and many changes and variations made all within the spirit of the invention and with the scope of the appended claims.

I claim:

1. A process for pasteurizing fresh or fresh frozen raw poultry comprising immersing said poultry having surface bacteria thereon in an edible oil, maintaining said oil at a temperature of from 180° F to 315° F and during the period after said poultry has been immersed in said oil at said temperature for ten seconds and before said poultry has been immersed in said oil at said temperature for sixty seconds, removing said poultry while still raw from said oil.

2. A process as set forth in claim 1 wherein said poultry is chicken.

3. A process as set forth in claim 1 wherein said poultry is turkey.

4. A process as set forth in claim 1 wherein said poultry is a whole poultry carcass.

5. A process as set forth in claim 1 wherein said poultry is only a part of the whole carcass.

6. A process as set forth in claim 1 which includes the step of chilling the poultry to a temperature of about 32° to 45° F and while the poultry is at said temperature immersing it in said oil.

7. A process as set forth in claim 1 which includes the step of draining said poultry after dipping to remove excess oil from the surface thereof.

8. A process as set forth in claim 1 wherein said poultry is frozen when immersed.

* * * * *